Oct. 23, 1928.
C. F. WRAY
1,689,095
VALVE STRUCTURE
Filed Feb. 1, 1926
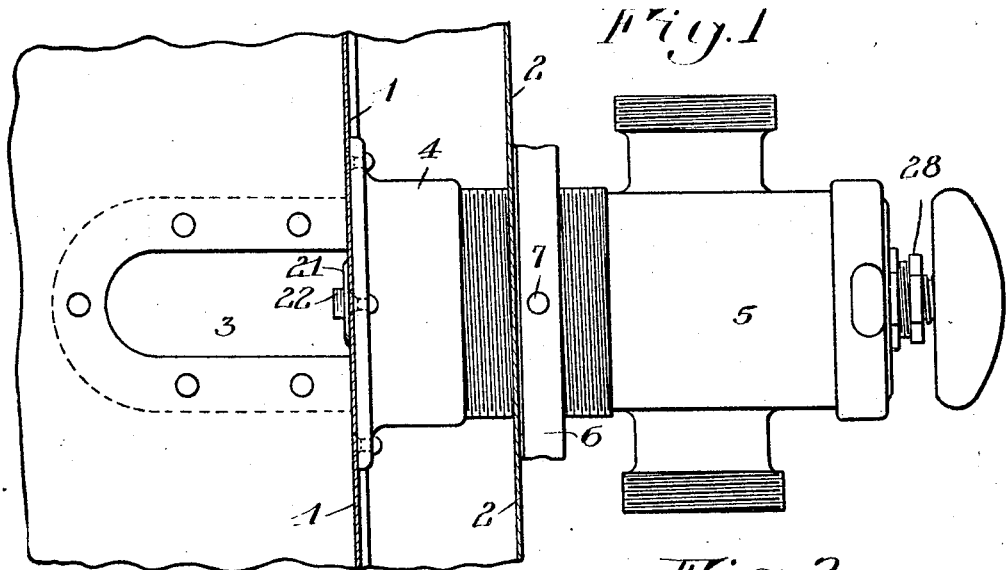
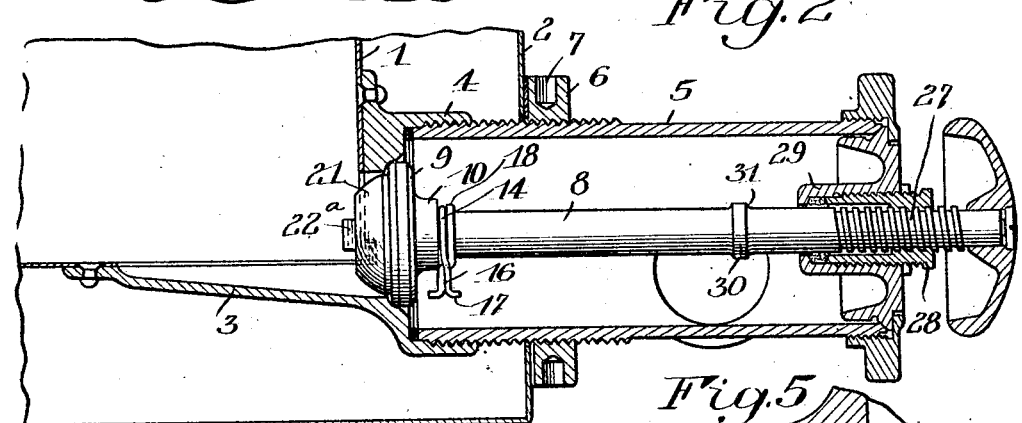
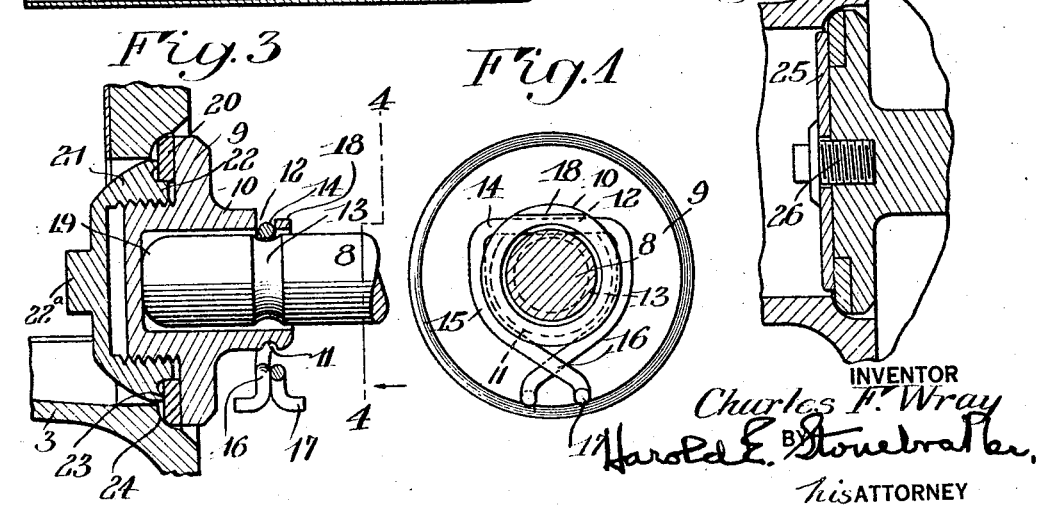
INVENTOR
Charles F. Wray
BY Harold E. Stonebraker
his ATTORNEY Patented Oct. 23, 1928.

1,689,095

UNITED STATES PATENT OFFICE.

CHARLES F. WRAY, OF ROCHESTER, NEW YORK, ASSIGNOR TO NATIONAL BRASS MANUFACTURING COMPANY, OF ROCHESTER, NEW YORK, A CORPORATION OF NEW YORK.

VALVE STRUCTURE.

Application filed February 1, 1926. Serial No. 85,212.

This invention relates to a valve structure, and more particularly to the type of valve mechanism used in milk pasteurization tanks.

One object of the invention is to afford a simple and practical means for detachably connecting a disc member on a valve stem so as to permit close and accurate seating of the disc member, and quick separation of said parts when necessary for sterilizing.

Another purpose of the improvement is to afford an arrangement of valve seat, and cooperating seating portion on a disc member, that insures a more effective closure than with previous valves of this type, and also a more durable seat construction.

An additional object of the invention is to provide an efficient construction, of few parts, for accurately positioning and securely retaining a seating portion on a disc member, and also for preventing leakage around the valve stem when the valve is open.

To these and other ends, the invention comprises the construction that will appear clearly from the following description, when read in conjunction with the accompanying drawing, the novel features being pointed out in the claims following the description.

In the drawing:

Figure 1 is a horizontal sectional view of a pasteurization tank, showing applied thereto a preferred embodiment of the invention, the valve body appearing in elevation;

Figure 2 is a vertical sectional view of the tank and valve structure;

Figure 3 is an enlarged sectional view of the disc member and seat;

Figure 4 is a sectional view on line 4—4 of Figure 3, and

Figure 5 is an enlarged sectional view of a modified form of disc member.

Referring more particularly to the drawings, in which like reference characters refer to corresponding parts throughout the several views, 1 and 2 designate respectively the inner and outer containers of a milk pasteurizing tank of conventional type, 3 designates a fitting permanently attached to the inner container 1 and including an interiorly threaded collar 4, and 5 is a valve body or housing extending through the outer container 2 and exteriorly threaded to engage the collar 4. The body 5 is held in proper relation to the container 2 by means of a nut 6 having suitable wrench receiving openings 7, a suitable washer being interposed between nut 6 and the container 2.

8 designates a valve stem that carries a disc member, or movable seat engaging element which, according to this invention, is detachably mounted on the valve stem in such a way as to permit slight relative play between said parts when in operation so as to insure tight, uniform engagement with the seat. To accomplish this, the disc member, which is designated generally at 9, has a hollow interior to receive the valve stem, and includes a cylindrical collar 10 having an annular recess 11 which is cut entirely through at 12 to provide an opening affording access to the interior of the cylindrical collar 10.

It is desirable to retain the disc member on the valve stem by a spring retainer, and with this in view, the valve stem is formed with an annular groove 13, and arranged in the recess 11 is the yieldable retainer, preferably consisting of a loop-shaped wire spring member, formed as shown, and including a straight portion 14 that extends through the opening 12 in the cylindrical collar portion 10, and engages the groove 13 in the valve stem, as shown in Figure 4. The straight portion 14 of the spring retainer terminates in curved ends 15 which rest in the recess 11, and are crossed at 16 to afford oppositely arranged lateral finger pieces 17, which permit of ready engagement to press the ends of the spring retainer toward each other when desired to expand the retainer and disconnect the disc member.

When thus expanded, the straight portion 14 is bowed outwardly far enough to disengage it from the groove 13, and permit the disc member to be removed from the valve stem. Adjacent to the opening 12 in the cylindrical collar 10, said collar is cut away at its periphery as indicated at 18 which permits of readily engaging and disengaging the spring retainer from the recess in the collar 10 when it is desired to separate the parts.

To assemble the spring retainer on the collar, the straight part 14 is first set in the opening 12 after which the crossed ends 15 are pressed toward each other while at the same time the retainer is forced over the end of the collar, permitting said ends 15 to spring into the recess 11 when the retainer is released and contracts. Then by inserting the valve stem within the collar 10 and forcing it inwardly as far as it will go, the groove 13 is brought into cooperative engagement with the straight portion 14 of the spring retainer and the parts are locked together by contraction of the spring retainer. The valve stem is rounded at its end, as indicated at 19, which permits a slight universal movement or play between the stem and disc member, insuring closed and more uniform seating of the disc member.

Arranged on the disc member is a seat portion 20 of block tin, suitable alloy, or other soft material adapted to proper engagement with the seat, said seat portion 20 being preferably in the form of an annular ring. The seat portion 20 is held in place on the disc member by a head which, as shown in Figure 3, is designated generally at 21 and is interiorly threaded for engagement with a correspondingly threaded portion on the disc member. The head 21 has a cylindrical inner end portion 22 which engages interiorly of the seat portion 20 and centers the same with reference to the disc member, while 23 is an annular flange or extension engaging the outer face of the seat portion and acting to hold it against the disc member. The head 21 is rounded or hemispherical to afford guiding means adapted to cooperate with the valve opening and center the disc member as it moves to seating position, and 22$^a$ is a squared portion, formed by cutting away the head at opposite sides, to receive a wrench for turning and removing the head from the disc member.

The seat portion 20 cooperates with a stationary valve seat designated at 24, and which as shown is transversely concaved. The seat portion 20 being of soft material, is arranged so that its outer edge engages approximately centrally of the transverse concavity of the valve seat, and is rounded slightly at such edge by being forced tightly against the stationary seat and thereby affords a positive and thoroughly liquid-tight fit between the disc member and valve seat. In the modified arrangement shown in Figure 5, the valve seat and movable seat portion cooperate and are constructed as already described. In this form, however, the seat portion is set in a recess in the disc member and is held thereon by a head 25 which in turn is held in place on the disc member by a threaded bolt 26.

The valve stem is threaded at 27 for engagement with a threaded bushing 28 mounted in the sleeve 29, and when the valve stem is moved outwardly to discharge the contents of the inner container 1, it is desirable to prevent leakage of milk from the valve body 5 at the points between the sleeve 29 and valve stem. To accomplish this, the valve stem is provided with a shoulder 30, and adjacent to the shoulder 30 on the valve stem, is a concaved surface 31, so that when the shoulder 30 comes into contact with the inner end of sleeve 29, instead of a flat surface being presented against the end of the sleeve, it is engaged by the curved or concaved surface 31 which fits closely against the adjacent corner of the sleeve 29 and affords an intimate, positive contact therewith at all points around the valve stem, effectively preventing any leakage between these parts.

While the invention has been described with reference to certain detailed arrangements, it is not confined to the precise construction disclosed, but may be modified in various respects, and this application is intended to cover any departures or changes coming within the underlying features of the invention or the scope of the following claims.

I claim:

1. The combination with a valve stem, of a hollow disc member embracing the end of the valve stem and means for detachably holding the disc member on the valve stem comprising an annularly arranged yieldable spring retainer mounted on the disc member, the latter having an opening through which a portion of said spring retainer projects inwardly to engage a recess in the valve stem.

2. The combination with a valve stem, of a disc member, and means for detachably holding the disc member on the valve stem comprising a yieldable loop-shaped spring retainer supported on the disc member, the latter having an opening through which a portion of the spring retainer extends and engages an annular groove on the valve stem.

3. The combination with a valve stem, of a quickly detachable disc member mounted thereon, and a spring retainer for holding said parts in operative relationship comprising a loop-shaped member having its ends crossing one another and formed to afford finger portions which when pressed together expand the retainer and release the disc member from the stem.

4. The combination with a valve stem, of a quickly detachable disc member mounted thereon with a cylindrical collar having an annular recess cut away at one portion to afford access to the interior of the collar, and a loop-shaped spring retainer seated in the recess and having a straight portion projecting through said opening and engaging an annular groove in the valve stem.

5. The combination with a valve stem having an annular groove, of a disc member having a cylindrical collar with an annular recess that is cut away at one point to afford an opening through the collar, and a spring retainer including a straight portion engaging said opening in the collar and the groove in the valve stem, said straight portion terminating in curved ends engageable with the recess in the collar and formed to afford oppositely disposed compressible finger pieces by which the retainer can be expanded to release the disc member from the valve stem.

6. The combination with a valve stem having an annular groove, of a disc member having a cylindrical collar provided with an annular recess cut away at one portion to afford an opening to the interior of the collar, a spring retainer consisting of a loop-shaped wire member having crossed end portions affording finger pieces by which it can be released from the valve stem and a straight portion adapted to project through the opening in said collar to engage the groove in the valve stem, the periphery of the collar being cut away adjacent said opening to afford a flat surface and permit ready engagement of the straight portion of the retainer with the recess in the collar.

7. The combination with a valve seat, of a disk member adapted to be attached to a valve stem, said disk member including a flat annular surface and a threaded end extending therebeyond, an annular seat member on said flat surface, said seat member being unrestrained at its outer edge by the disk member, and a retaining head threaded on said end extension of the disk member and extending completely across the latter, the head having a spherical guiding portion cooperating with the valve seat so as to center the disk member, a cylindrical flange having its outer periphery in engagement with the inner edge of the annular seat member, and an extension having an annular flange bearing against the face of said seat member to clamp it against said flat annular surface of the disk member, said annular flange being separated from said cylindrical flange by a depressed surface out of contact with the seat member.

In witness whereof, I have hereunto signed my name.

CHARLES F. WRAY.